(12) United States Patent
Chang et al.

(10) Patent No.: US 9,619,927 B2
(45) Date of Patent: Apr. 11, 2017

(54) VISUALIZATION OF OBJECTS ALONG A STREET

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation

( * ) Notice: Subject to any disclaimer, the term of this patent is extended or adjusted under 35 U.S.C. 154(b) by 113 days.

(21) Appl. No.: 14/187,209

(22) Filed: Feb. 21, 2014

(65) Prior Publication Data

US 2015/0242995 A1    Aug. 27, 2015

(51) Int. Cl.

| | |
|---|---|
| *G06T 15/00* | (2011.01) |
| *G06T 15/20* | (2011.01) |
| *G06F 3/0484* | (2013.01) |
| *G06F 3/0481* | (2013.01) |
| *G06F 17/30* | (2006.01) |
| *G06T 3/00* | (2006.01) |
| *G06T 3/40* | (2006.01) |
| *G06T 13/80* | (2011.01) |
| *G06T 17/05* | (2011.01) |
| *G09B 29/00* | (2006.01) |

(52) U.S. Cl.
CPC ............ *G06T 15/20* (2013.01); *G06F 3/0481* (2013.01); *G06F 3/04815* (2013.01); *G06F 3/04842* (2013.01); *G06F 17/3028* (2013.01); *G06F 17/30241* (2013.01); *G06F 17/30244* (2013.01); *G06F 17/30554* (2013.01); *G06F 17/30991* (2013.01); *G06F 17/30994* (2013.01); *G06T 3/0087* (2013.01); *G06T 3/4038* (2013.01); *G06T 13/80* (2013.01); *G06T 17/05* (2013.01); *G09B 29/007* (2013.01); *G06T 2210/32* (2013.01)

(58) Field of Classification Search
CPC ...... G06T 17/05; G06T 3/4038; G06T 19/003; G06F 3/04815; G06F 17/30241; G01C 21/3679; G01C 21/3682; G01C 21/32; H04N 5/23238
USPC ......... 345/419, 420, 632; 701/426; 715/850; 455/456.3
See application file for complete search history.

(56) References Cited

U.S. PATENT DOCUMENTS

| | | | |
|---|---|---|---|
| 6,895,126 B2 | 5/2005 | Di Bernardo et al. | |
| 7,746,376 B2 | 6/2010 | Mendoza et al. | |
| 8,466,915 B1* | 6/2013 | Frueh ............................ | 345/420 |
| 8,467,954 B2* | 6/2013 | Kobuya ................. | G01C 21/36 340/988 |
| 8,635,557 B2* | 1/2014 | Geise et al. .................. | 715/850 |
| 8,700,300 B2* | 4/2014 | LeBeau et al. ............... | 701/426 |

(Continued)

OTHER PUBLICATIONS

Kopf et al, Street Slide: Browsing Street Level Imagery, Microsoft Research, Jul. 6, 2010, pp. 1-8.*

(Continued)

*Primary Examiner* — Phu K Nguyen
(74) *Attorney, Agent, or Firm* — Anthony V. S. England; Joseph C. Polimeni (57) ABSTRACT

For visualization of objects along a length of street, a user selection of a street is received. The selected street is displayed in an above-street view. At least a first plurality of street view images are concurrently displayed for objects along at least a first side of the selected street.

10 Claims, 8 Drawing Sheets

(56) References Cited

U.S. PATENT DOCUMENTS

| | | |
|---|---|---|
| 8,825,280 B2 | 9/2014 | Tanaka |
| 8,913,083 B1 * | 12/2014 | Ogale et al. .................. 345/632 |
| 8,948,788 B2 * | 2/2015 | Conway et al. ........... 455/456.3 |
| 2002/0165933 A1 | 11/2002 | Yu et al. |
| 2008/0111831 A1 | 5/2008 | Son et al. |
| 2008/0285886 A1 | 11/2008 | Allen |
| 2010/0034426 A1 | 2/2010 | Takiguchi et al. |
| 2010/0302280 A1 | 12/2010 | Szeliski et al. |
| 2011/0279452 A1 | 11/2011 | Ibe et al. |
| 2012/0133639 A1 | 5/2012 | Kopf et al. |
| 2012/0306913 A1 | 12/2012 | Fialho et al. |

OTHER PUBLICATIONS

Choi et al, Multi-Perspective Image Generation for Visualization of Scene included Buildings, Kyungpook National University, Jan. 2009, pp. 1-4.*
Kopf et al, Street Slide: Browsing Street level Imagery, ACM Trans. Graph. 29, 4, Article 96, Jul. 2010, pp. 96:1-96:8.*
Whitney, Microsoft enhances its Bing Streetside View, Cnet, Jun 2, 2011, http://news.cnet.com/8301-10805_3-20068331-75/microsoft-enhances-its-bing-streetside-view/.

* cited by examiner

VISUALIZATION OF OBJECTS ALONG A STREET

FIELD OF THE INVENTION

The present invention relates to visualization of objects along a street and, more specifically, relates to displaying a plurality of street view images for objects along a selected street.

BACKGROUND

Figure 4:
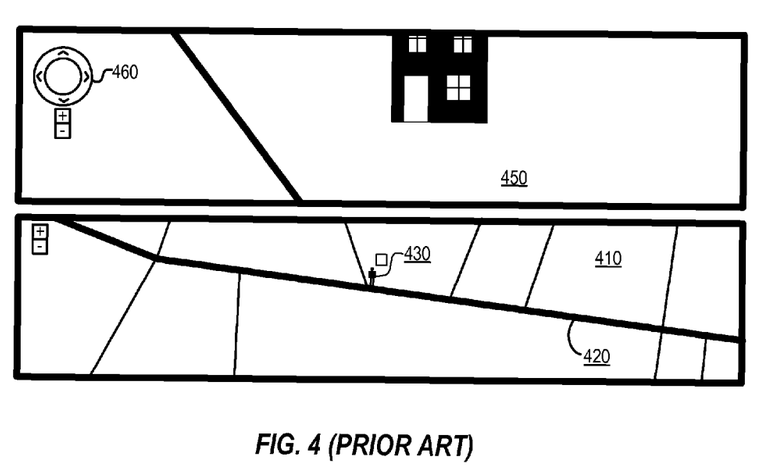
FIG. 4 illustrates a street view of a vantage point on a street, where the street view is laid out above a satellite view that includes the street, according to the prior art.

It is known to present a street view image 450 responsive to user selection of a street 420 vantage point 430 on a satellite image 410, as shown in FIG. 4, or on a map. A map and a satellite image are both examples of what may be referred to herein as a "plan view," which is a view 410 that shows street 420 from a vantage point that is substantially directly above street 420, as if from the vantage point of an airplane or satellite. In an alternative to plan view 410, a perspective view may be provided that shows a perspective layout of streets such as street 420 viewed from a vantage point that is higher than eye level above street 420, but not as high as a satellite or an airplane, and that is at a substantial distance to the side of street 420. Plan and perspective views are each examples of a view referred to herein as an "above-street" view.

Street view 450 shows an image from a selected vantage point 430 at substantially eye level directly above a point on street 420 and looking away from street 420 as if standing or driving on street 420. The user may then rotate the initial plane of street view 450 to a obtain an image from the same vantage point 430, but viewing more upward or downward or more forward or backward along the path of street 420, which the user may do by manipulating interface object 460.

The term "street" as used herein refers to any kind of path, whether public or private and whether in a populated or unpopulated area, for which images are stored of objects there beside, such as buildings, trees, signs, features of the terrain, etc. The term "street" includes a highway, road or frontage road, avenue, boulevard, pedestrian walkway, trail, etc. The term "street view" as used herein generally refers to an image of such objects taken from a vantage point on a street, or at least near the street and between the street and the object or objects in the image. In certain usages, the term "street view" may be limited as described in the paragraph herein above to refer to an image that is a view of one or more objects in, or projected upon, a plane that is, at least initially, substantially vertical relative to a substantially horizontal plan for the street, where the plane for the street is a the street is in or a plane directly above the street upon which an image of the street is projected. The term "image" may refer to a depiction, which may be photorealistic or less than photorealistic, and may refer to a photographic image. The term "street view" and the term "street view image" may be used interchangeably herein.

SUMMARY

According to an embodiment of the invention, a method for visualization of objects along a length of street includes receiving a user selection of a street. In other aspects, the method includes displaying the selected street in an above-street view and displaying at least a first plurality of street view images concurrently for objects along a first side of the selected street.

In a further aspect, the street view images are from respective vantage points along the selected street and displaying the at least first plurality of street view images includes displaying the street view images laid out along the selected street in the above-street view and proximate to their respective vantage points.

In another aspect, displaying the at least first plurality of street view images includes displaying thumbnail images.

In another aspect, displaying the at least first plurality of street view images includes displaying the at least first plurality of street view images outside the above-street view.

In another aspect, displaying the at least first plurality of street view images includes displaying the at least first plurality of street view images in a panoramic image.

In another aspect, the at least first plurality of street view images are for a certain length of the selected street and the certain length is determined responsive to a user selection of beginning and ending points for the certain street.

In another aspect, the at least first plurality of street view images are for a certain length of the selected street and the certain length is an entire length of the street that is shown in the above-street view.

Other embodiments of the invention are disclosed and claimed, including a computer system implementation and a computer program product.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 5:
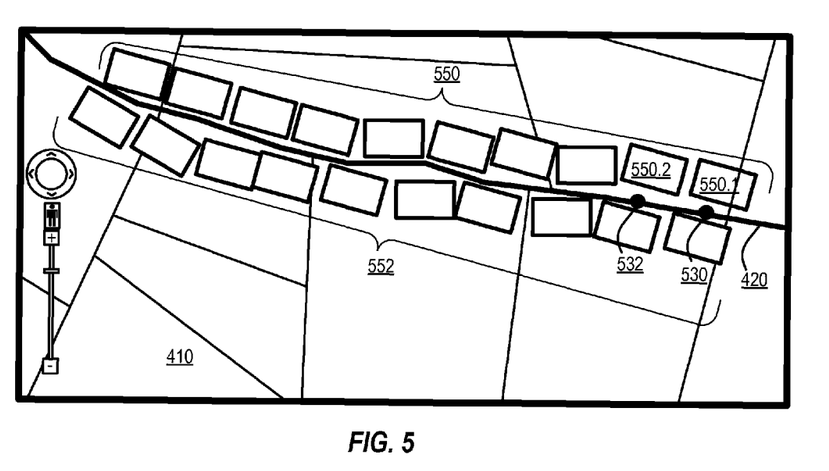
FIG. 5 illustrates a selected street displayed in an above-street view, a first plurality of thumbnail street view images displayed concurrently for objects along a first side of the selected street and a second plurality of thumbnail street view images displayed concurrently for objects along a second side of the selected street, according to embodiments of the present invention.

FIG. 5 depicts sets 550 and 552 of thumbnail, street view images displayed along a user-selected length of a user-selected street 420 depicted by a process of a street view application in a user interface, according to one or more embodiments of the present invention, which enables the user to quickly visualize composite views of objects on each side of street 420 along its selected length. Embodiments of the present invention disclosed herein enable a user to see street-view images 550 and 552 along a user-determined length of street 420 without having to perform a series of cumbersome navigation operations in the user interface, e.g., without having to undertake the time consuming task of moving a cursor from one vantage point 530, 532, etc. to the next along a map or satellite image of street 420.

Although the individual thumbnail, street view images themselves of sets 550 and 552 are not shown in FIG. 5, this is merely due to limitations regarding detail that can be depicted in FIG. 5. It should be understood that in actual implementation, a computer system renders a street view, for each individual thumbnail image in sets 550 and 552, such as on a computer display, where each street view is from its respective vantage point on street 420, in a fashion like street view 450 in FIG. 4 herein, except that the thumbnail images are generally smaller than image 450 shown in FIG. 4.

Further, according to these one or more embodiments, the user interface may present street-view images 550 and 552 not as just a fleeting series of images, i.e., not in the manner of a motion picture view, where a series of images are presented as if the user were passing from one vantage point to another along the street in a moving vehicle. Rather, responsive to a quick, efficient user operation, the user interface presents to the user street-view images 550 and 552 for a length of street 420, where images 550 and 552 are still, thumbnail images of objects in a plane vertical to the top down view of plan view 410, but laid out in the plan view 410 (or in an alternative view, such as in a perspective view) along and beside street 420. (The user may modify the plane of the street view images, such as by manipulating interface object 460.)

More specifically, as shown, the user interface presents images 550 in view 410 above street 424 of objects on the corresponding side of the street and presents images 552 in view 410 below street 424 of objects on their side of the street, where each one of the images 550 and 552 is near its respective vantage point 530, 532, etc. For example, image 550.1 is next to vantage point 530; image 550.2 is next to vantage point 532, etc. Thus, each one of the images in the set of images 550 appears along street 420 according to a sequence corresponding to a sequence of vantage points 530, 532, etc. Likewise, each one of the images in the set of images 552 also appears along street 420 according to a sequence corresponding to the sequence of vantage points 530, 532, etc.

According to one or more embodiments of the present invention, a user may cause the user interface to present street-view images 550 and 552 laid out on plan view 410 (or, more generally, on any type of above-street view) for a selected length of street 420 by activating a predetermined hot key on a keyboard, by selecting a command option on a pull down menu, for example, which a user interface software module detects. In the example shown in FIG. 5, the user selected length is the entire length of street 420 that is shown in plan view 410, which is according to a user selected option specifying how to communicate the selected length to the user interface software module. According to embodiments of the present invention, there are other options for specifying how to communicate the selection of street length. According to one other such option, the user positions a cursor on one end of a selected length of street 420, such as a cursor controlled by a cursor control device such as mouse, trackball, trackpad, etc., holds down a predetermined button of the cursor control device, drags the cursor to the other end of the selected length, and releases the button.

Responsive to receiving the user command to present street view thumbnail images 550 and 552 for selected length of selected street 420, user interface software module generates vantage points 530, 532, etc. on street 420, where vantage points 530, 532, etc. are at consistent intervals, i.e., separated by a fixed-distance, according to embodiments of the present invention. The software module then selects, from among stored street view images, those street view images that correspond to the generated vantage points 530, 532, etc. and presents those images. The fixed distance may be preset by a user selected initialization option, so that the user can customize.

In one or more embodiments of the present invention, the user interface software maintains the still, thumbnail, street-view images 550 and 552 beside street 420 presented in plan view 410 (or similar view) for as long as the user wants to view them, i.e., until the user performs an operation to terminate the street view image viewing or performs another operation that automatically clears the sets of images 550 and 552 and replaces them with one or more other images or image sets, such as an operation wherein the user selects another length of street 420 for street view image viewing or selects some other street or other matter for viewing. In one or more alternative embodiments of the present invention, still images 550 and 552 are presented for a time interval that is predetermined by the user, such as a certain number of seconds, for example, rather than being presented until the user performs an operation to terminate the presentation of the images.

In general terms, the user interface application presents thumbnail street view images in such a manner as to communicate correspondence between a thumbnail image and its respective vantage point. As previously stated, each one of thumbnail images from set 550 and 552 may be laid out proximate to its respective vantage point 530, 532, etc. This is one way of communicating the correspondence between a thumbnail image and its vantage point. According to this way, each image is generally close enough to its respective vantage point such that it is unambiguous which image corresponds to which vantage point, according to one or more embodiments of the present invention. For example, each image may be closer to its respective vantage point than any of the other images on the same side of street 420. This may depend on the spacing of vantage points 530, 532 and the size of thumbnail images 550 and 552. For example, thumbnail images 550.1, 550.2. etc. may all be essentially the same width, vantage points 530, 532, etc. may be less than two thumbnail widths apart, and an image 550.1 may be closer to its vantage point 530 than next image 550.2 by less than the thumbnail image width. In another example, vantage points 530, 532, etc. may be four thumbnail widths apart, and an image 550.1 may be closer to its vantage point 530 than next image 550.2 by less than two thumbnail image widths. The image widths and distances from images to vantage points may vary, so long as each image is generally close enough to its respective vantage point such that it is unambiguous which image corresponds to which vantage point.

In addition to proximity, or as an alternative, the user interface application may present indicia as a way to communicate correspondence between a street view image and its respective vantage point. This is described in more detail herein below with regard to panoramic street views, but indicia may also be presented for thumbnail street views.

Figure 6:
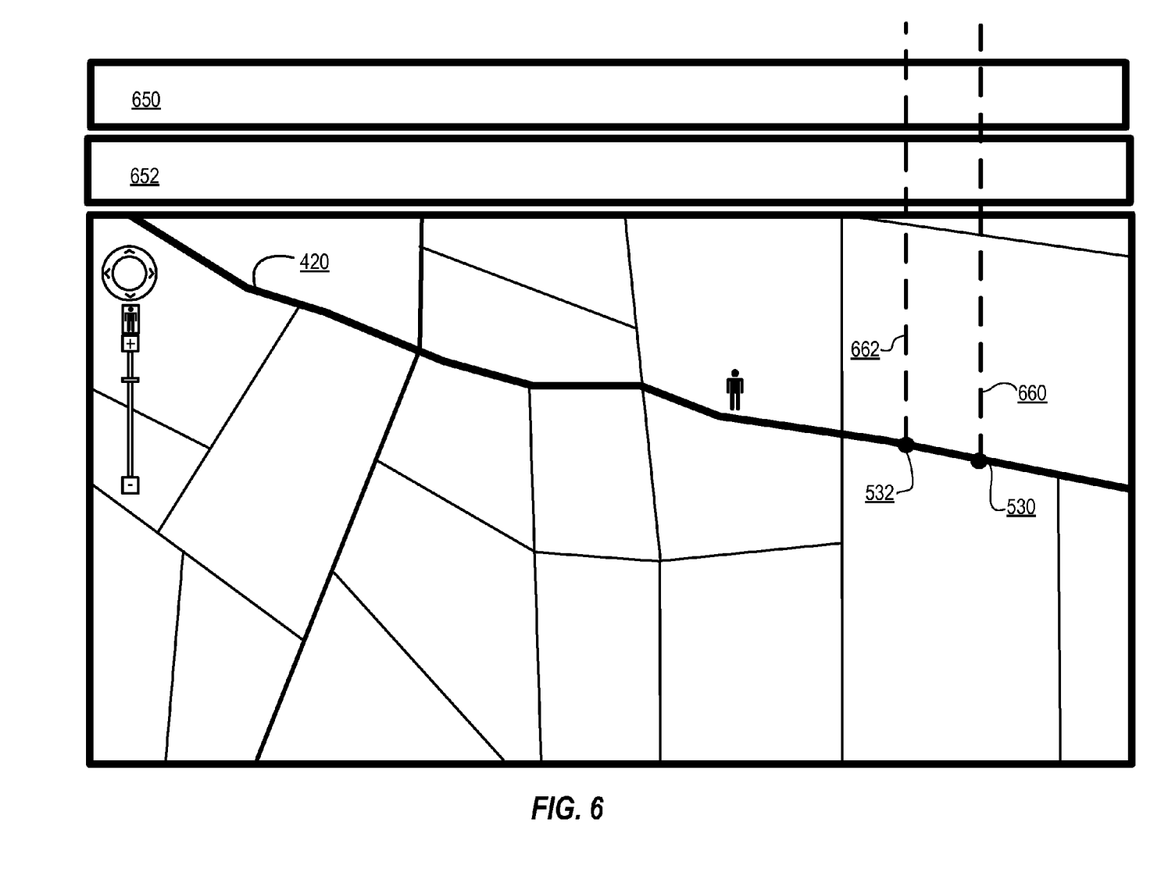
FIG. 6 illustrates a first, multiple vantage point panoramic street view image displayed for objects along a first side of the selected street and a second, multiple vantage point panoramic street view image displayed concurrently for objects along a second side of the selected street, according to embodiments of the present invention.

FIG. 6 shows panoramic street views 650 and 652 of the user-selected length of the user-selected street 420, according to one or more embodiments of the present invention, which enables the user to quickly visualize a panoramic street view of each side of street 420 along the selected length. According to one or more embodiments of the present invention, a user may cause the user interface to present panoramic street-view images 650 and 652 for a selected length of street 420 by activating a different predetermined hot key on a keyboard than the hot key designated for thumbnail street view images 550 and 552, by selecting a different command option on a pull down menu, for example, which a user interface software module detects.

For panoramic street views 650 and 652 the software module selects, from among stored street view images, those street view images that correspond to the generated vantage points 530, 532, etc., described above for thumbnail images in FIG. 5. However, instead of presenting the selected images as thumbnails, the software module stitches the thumbnail images together into multiple vantage point panoramic images.

Note that in the one or more embodiments depicted in FIG. 6, the user interface presents panoramic street views 650 and 652 above plan view 410, rather than within plan view 410. In alternative embodiments, panoramic street views 650 and 652 may be presented below plan view 410 (or similar view), or one of the views 650 and 652 may be presented above plan view 410 (or similar view) and the other one of the views 650 and 652 may be presented below plan view 410 (or similar view). In other words, panoramic street views 650 and 652 may be presented above or below plan view 410 (or similar view), or may be presented, respectively, both above and below. Alternatively, they may be presented within plan view 410 (or similar view), as depicted for images 550 and 552 in the arrangement of FIG. 5. Likewise, images 550 and 552 of FIG. 5 may alternatively be presented above or below plan view 410 or similar view, or may be presented, respectively, both above and below.

It should be appreciated that panoramic images 650 and 652 of FIG. 6 provide a somewhat more integrated view of objects beside street 420 than do the thumbnail street view images 550 and 552 of the arrangement depicted in FIG. 5. However, the thumbnail arrangement of FIG. 5 is advantageous in that it enables the user to easily see how individual features shown in individual thumbnail, street view images of image sets 550 and 552 precisely correspond to their respective vantage point 530, 532, etc. locations on street 420. For example, in a given situation the user wants to find a particular building that the user will recognize if seen. The user knows the building is somewhere along the selected length of street 420. In a situation where one of the images 550.1 of image set 550 in FIG. 5 corresponds to vantage point 530 and shows the recognizable front of the building, since image 550.1 is clearly laid out next to vantage point 530 on street 420.

As described above, the thumbnail arrangement of FIG. 5 enables the user to more precisely identify where a building is located on street 420 than if the building were merely shown in a panoramic image 650 without including indicia relating the building to a particular location in view 410 on street 420. That is, according to one or more embodiments of the present invention, there is a single vantage point shown in an above-street view 410 for each thumbnail street view image, such as vantage point 530 for image 550.1, for example, or each corresponding pair of thumbnail street view images on the two sides of street 420. Further, the thumbnail images may be presented proximate to their respective vantage points, as previously explained. In contrast, each panoramic image such as image 650, for example, is long and has multiple vantage points 530, 532, etc. from all along a selected length of street 420. According to one or more embodiments of the present invention, the user interface presents panoramic images 650 and 652, with indicia that enable the user to more easily see how individual features shown in images 650 and 652 precisely correspond to respective locations in view 410 on street 420. In one aspect, user interface presents vantage points 530, 532, etc. on selected street 420 in view 410 and presents a corresponding vertical indicia line 660, 662, etc. through each such vantage point 530, 532, etc. in view 410, where each line 660, 662, etc. extends to or through a corresponding position in panoramic street view images 650 and 652. Alternatively, rather than a line 660, 662, etc. extending from each vantage point 530, 532, etc. to or through corresponding points in each panoramic street view image 650 and 652, an indicia point or highlighted object is shown in each panoramic image 650 and 652 for each vantage point 530, 532, etc.

Figure 7:
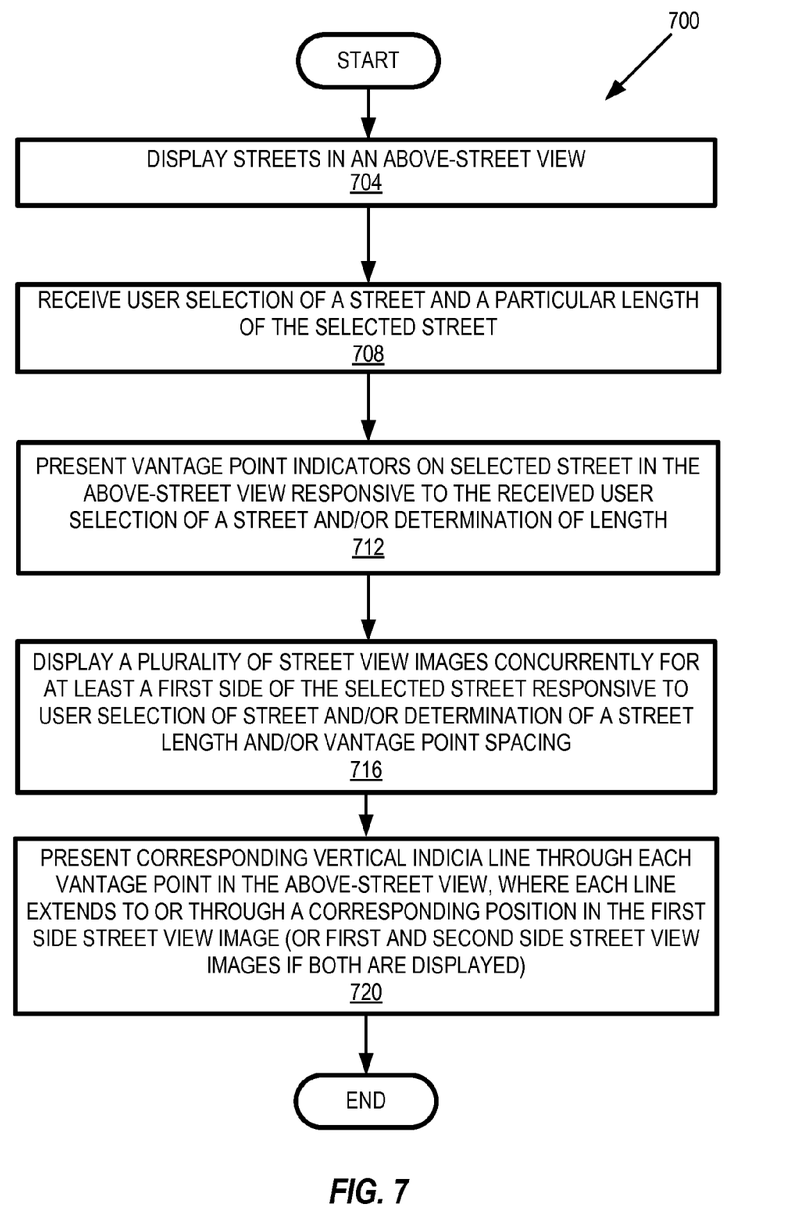
FIG. 7 illustrates aspects of a process for visualization of objects on a street, according to embodiments of the present invention.

Referring now to FIG. 7, aspects of a process 700 are illustrated for visualization of objects along a length of street, according to one or more embodiments of the present invention. Process 700 includes displaying 704 one or more streets in an above-street view and receiving 708 user selection of a street and a particular length of the selected street. Regarding receiving 708 user selection of the street, process 700 may determine the selected street responsive to receiving a street address entered by the user or responsive to the user moving a cursor via pointing device to a point on the street shown in a displayed 704 view of the street and the user selecting the point via a button of the pointer device, according to one or more embodiments of the present invention. The displaying 704 of the selected street may be before or after the user selection of the street, or both before and after.

Regarding receiving 708 user selection of the street length, process 700 may determine the length responsive to a user selection of beginning and ending points shown in the displayed 704 above-street view of the selected street, which may be by the user holding down a pointer device button and dragging a window around the length of street and then releasing the button or by moving a cursor to beginning and ending points using the pointer device and selecting the points via a button of the pointer device, according to one or more embodiments of the present invention. The automatic selection may be responsive to a command from the user at the time of user selection of the street. For example, process 700 may present an automatic length choice to the user when the user selects the street, so that the user may select the automatic length option. Alternatively, process 700 may automatically select the entire length of the selected street that is shown in the above-street view when the user selects the street responsive to an initialization parameter set by the user before the street selection.

Responsive to receiving user selection of a street and determination of a street length, process 700 presents 712 vantage point indicators on the selected street in the above-street view. Process 700 may space the vantage point indicators at regular intervals, such as the distance measured in multiples of thumbnail image width. Process 700 may space the vantage point indicators responsive to receiving a user input specifying the spacing as a width or other distance.

Responsive to user selection of a street and determination of a street length and vantage point spacing, process 700 displays 716 a plurality of street view images concurrently for at least a first side of the selected street, according to one or more embodiments of the present invention. This includes displaying a first plurality of street view images for objects on the first side at vantage points along the selected length of the street, and may include also concurrently displaying a second plurality of street view images for objects on a second side of the street at vantage points along the selected length of the street, which may be the same vantage points.

According to one or more embodiments of the present invention, displaying the street view images concurrently for first and second sides of the selected street includes displaying the images laid out on the above-street view, wherein thumbnail street view images are displayed beside the street and proximate to their respective vantage points, with the first plurality of street view images displayed on the first side of the street and the second plurality of street view images displayed on the second side of the street. Alternatively, displaying the street view images concurrently for the selected street includes displaying the images outside the above-street view either above, below or respectively above and below the above-street view.

According to one or more embodiments of the present invention, displaying street view images concurrently for a first side of the selected street, or for first and second sides of the selected street, includes displaying thumbnail images or panoramic images or both.

According to one or more embodiments of the present invention, in the instance when presenting a panoramic street view image for the first side or first and second sides of the street, process 700 presents 720 a corresponding vertical indicia line through each such vantage point in the above-street view, where each line extends to or through a corresponding position in the first side panoramic street view image or first and second side panoramic street view images. Alternatively, rather than a line extending from each vantage point to or through corresponding points in each panoramic street view image, an indicia point or highlighted object is shown in each panoramic image for each vantage point.

Likewise, when presenting 716 thumbnail street view images that are relatively distant from their respective vantage point indicators, such as when presenting thumbnail street view images laid out outside of the above-street view, process 700 presents 720 a corresponding vertical indicia line through each vantage point in the above-street view, where each line extends to or through a corresponding position in the first side thumbnail street view image or first and second side thumbnail street view images. Again, rather than a line extending from each vantage point to or through corresponding points in each street view image, an indicia point or highlighted object may alternatively be shown in each street view image for each vantage point.

Figure 8:
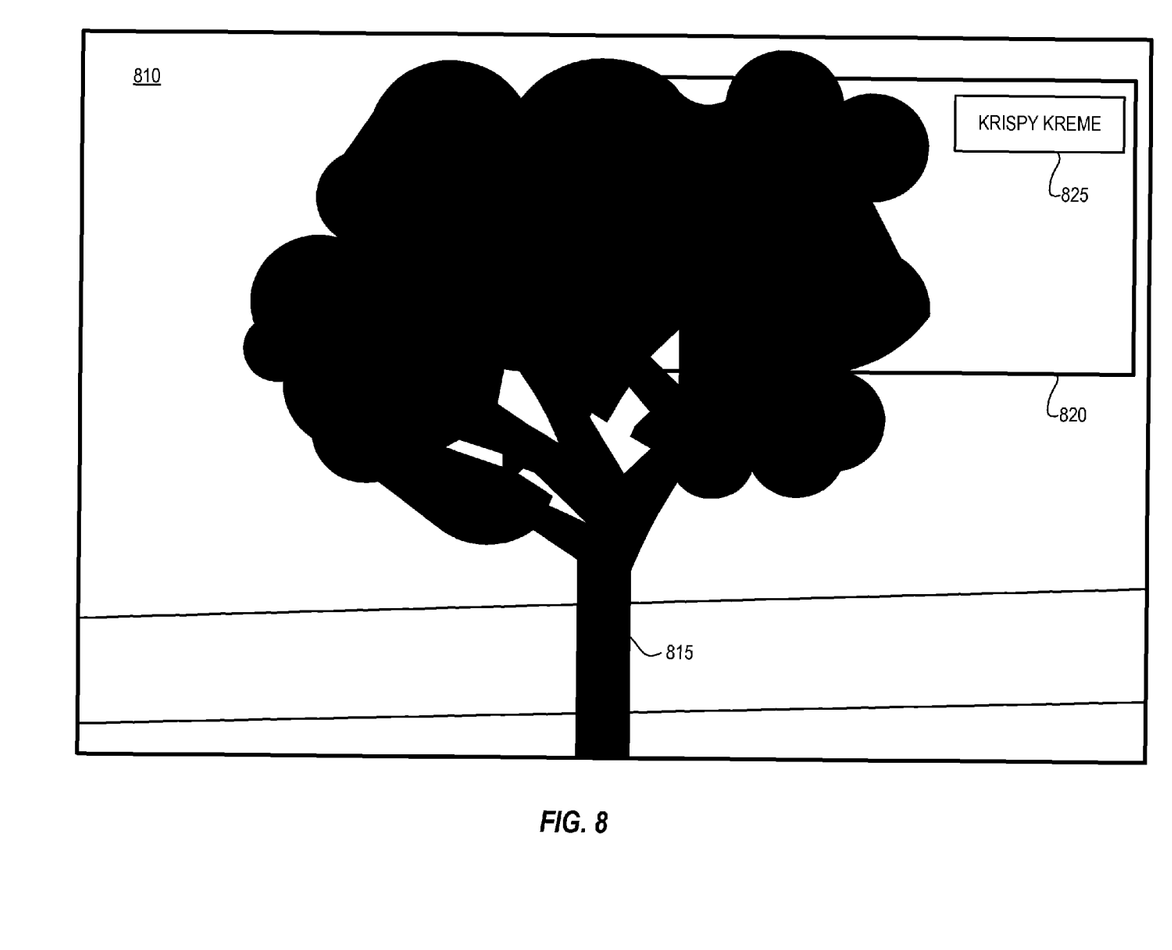
FIG. 8 illustrates a street view showing a building having a side facing a vantage point on a street according to embodiments of the present invention.
Figure 9:
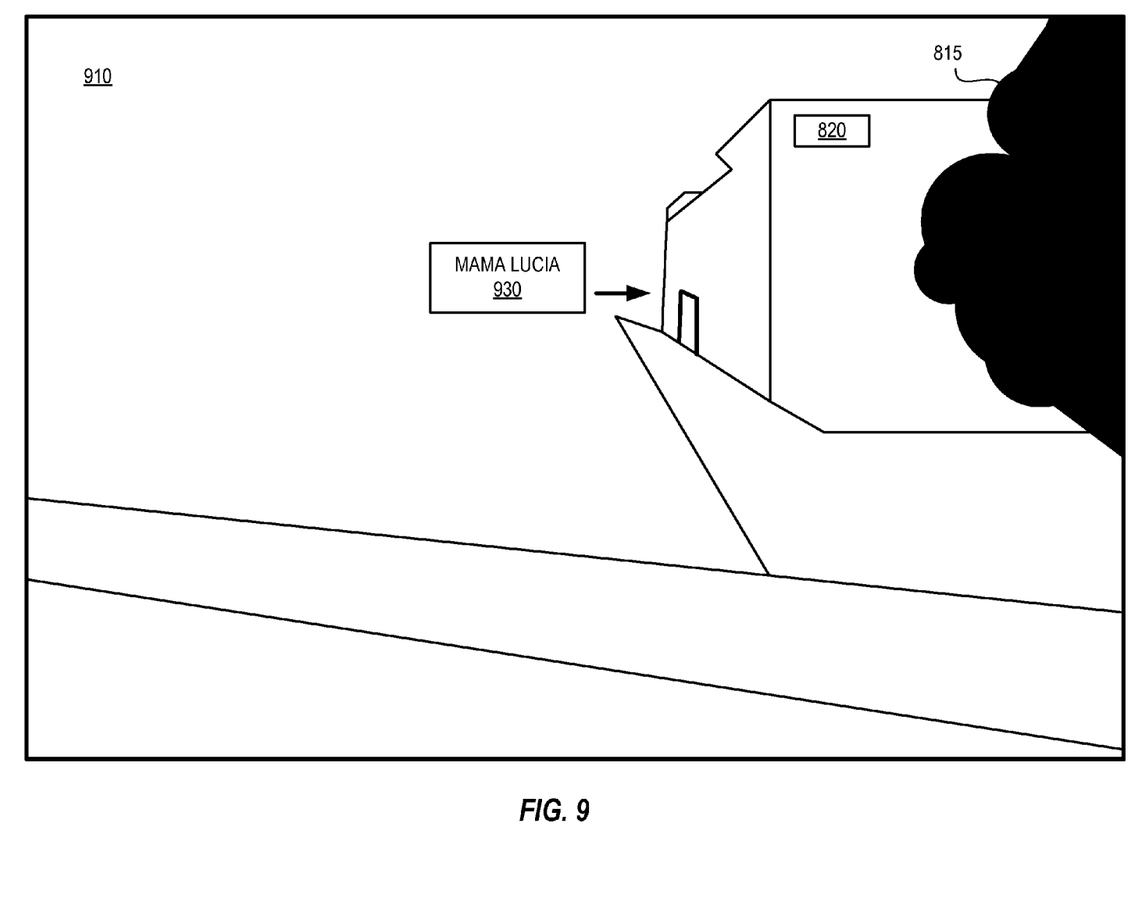
FIG. 9 illustrates a street view showing the building of FIG. 8 from a different vantage point on the same street, wherein a side facing perpendicular to the street is visible, according to embodiments of the present invention.

According to one or more embodiments of the present invention, aspects of which are depicted in FIGS. 8 and 9 herein, additional street view features are provided relating to advertising. FIGS. 8 and 9 show street views 810 and 910 respectively. Street views 810 and 910 are shown as large images herein in order to label details for the purpose of explanation, but in actual embodiments of the present invention may be thumbnails such as 550.1 and. 550.2 shown in FIG. 5, for example.

According to an advertising aspects depicted in FIG. 9 an enterprise pays a street view application provider to highlight a business location in an appropriate street view. Consequently, when the application provider's street view process presents to a user a street view in a user interface which at least part of the business location is shown, the process highlights the business location in some fashion to make the location more noticeable. To illustrate the advertising aspects depicted in FIG. 9, it is helpful to first consider FIG. 8, in which a first street view image 810 is shown. Street view 810 depicts a side of a building 820 facing a vantage point on a street. The vantage point is directly in front of tree 815. The side of building 820 shown in FIG. 8 is clearly marked by a sign 825 showing that building 820 is a Krispy Kreme donut shop. Sign 825 is easily visible since it faces the street.

In FIG. 9, a second street view image 910 is shown, which illustrates a different situation. Street view 910 depicts the same building 820 from a vantage point on the same street, but to the left of tree 815. In street view 910 of FIG. 9, the side of building 820 that faces the street is still shown, but an additional side is also shown that faces perpendicular to the street. There is a business that is accessible on the side of building 820 that faces away from the street, a Mama Lucia restaurant. If there is a sign identifying the restaurant, no actual image of the sign is visible enough in view 910 for the user to identify the restaurant. In the illustrated example, the owner has paid the street view application provider to highlight the location of the owner's restaurant, Mama Lucia, so that the restaurant is highlighted in view 910. In the particular embodiment illustrated, the highlighting is by a text box 930 included in image 910 with the words "Mama Lucia" along with an arrow pointing to the restaurant entrance.

It should be appreciated that while the advertising feature described above is particularly useful for the situation of FIG. 9, in which a business location is not clearly visible in street view 910 due to the vantage point, this same advertising feature could also be provided even for situations in which the business location is clearly visible, such as the example of the Krispy Kreme donut shop in FIG. 8. Since the Krispy Kreme sign 825 is visible in the situation shown in FIG. 8, the highlighting may be different than a text box that sets out the name of the business, as was shown for the Mama Lucia restaurant in FIG. 9. Rather, the highlighting may be done by including a striking color that draws the user's attention to the already visible sign on the building, for example. Or by a text box that sets out text other than the name of the business, which may be very large text.

Figure 1:
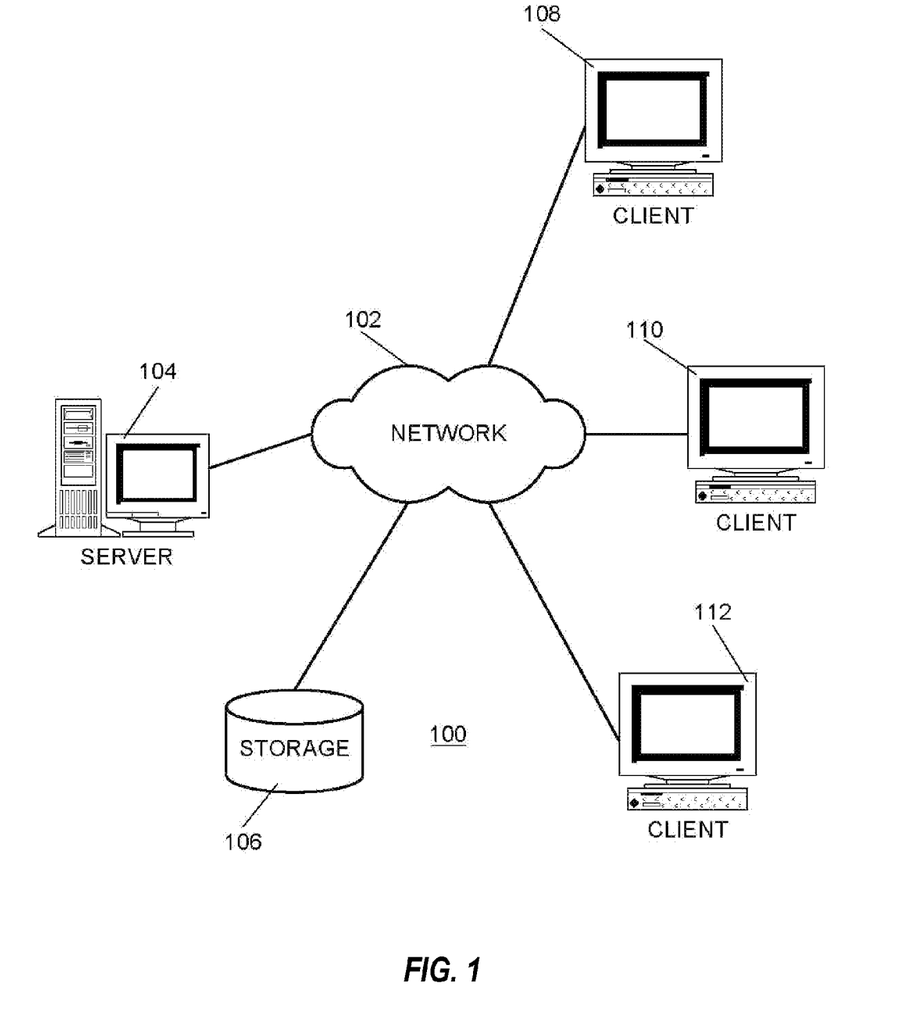
FIG. 1 is an exemplary block diagram illustrating a distributed data processing system according to embodiments of the invention.

Regarding FIG. 1, a pictorial representation of a network data processing system 100 is shown in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
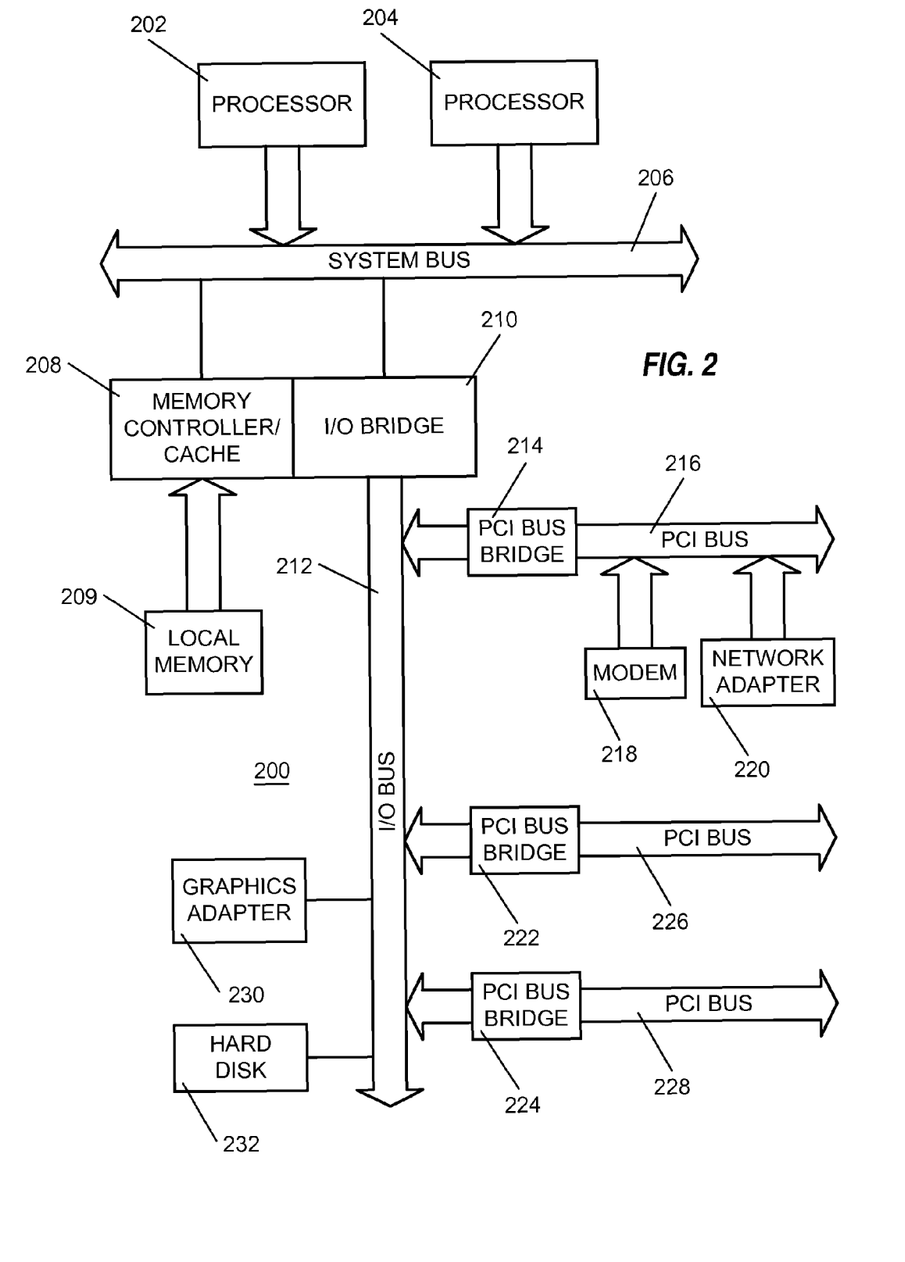
FIG. 2 is an exemplary block diagram of a server apparatus according to embodiments of the invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support one or more PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ series system, running the IBM® AIX® operating system or LINUX® operating system. (IBM, eServer and AIXZ are trademarks of International Business Machines Corporation, registered in many jurisdictions worldwide. Linux is a registered trademark of Linus Torvalds in the United States, other countries, or both.)

Figure 3:
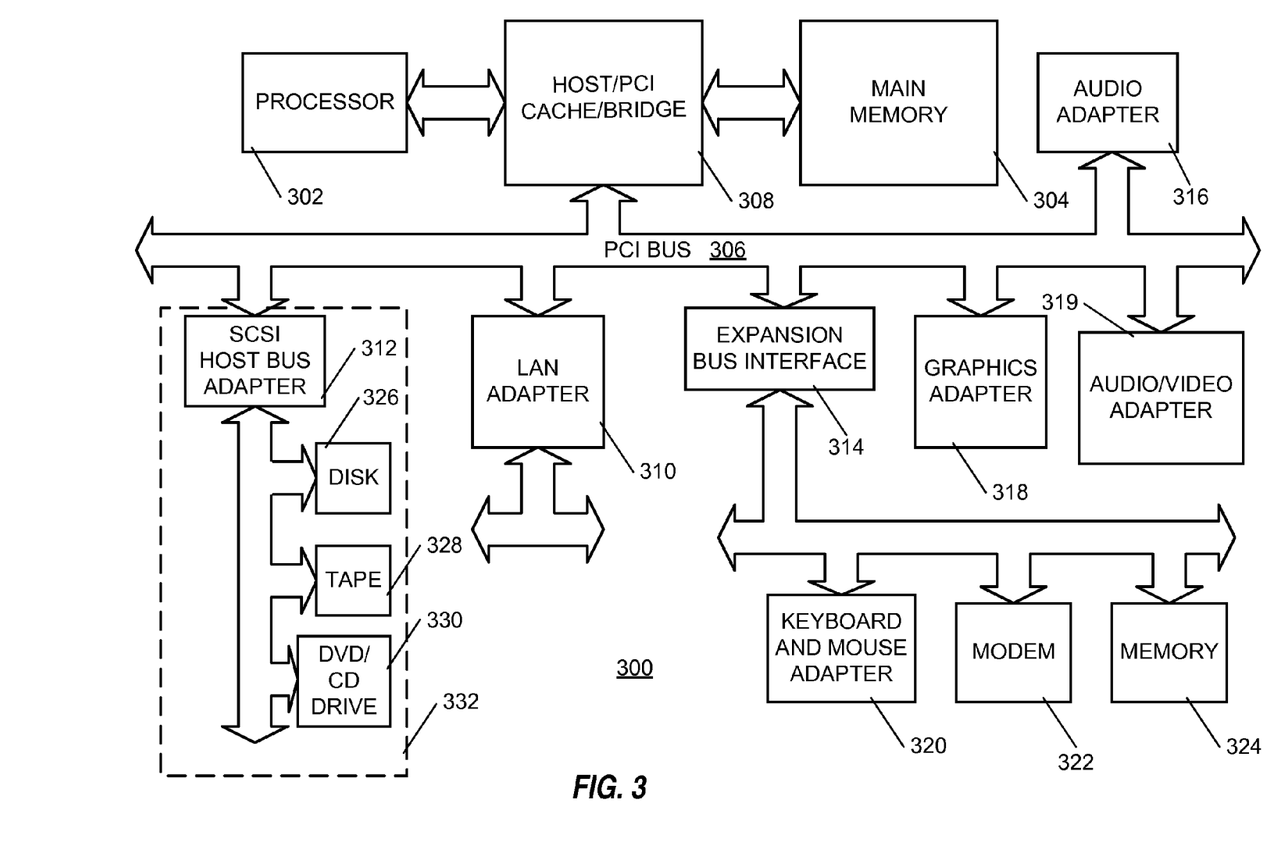
FIG. 3 is an exemplary block diagram of a client apparatus according to embodiments of the invention.

With reference now to FIG. 3, a block diagram illustrating a data processing system is depicted in which in an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support a plurality of PCI expansion slots or add-in connectors.

An operating system runs on processor 302 and is used to coordinate and provide control of various components within data processing system 300 in FIG. 3. The operating system may be any available operating system (commercial or open source). An object oriented programming system such as Java may run in conjunction with the operating system and provide calls to the operating system from Java programs or applications executing on data processing system 300. (Java and all Java-based trademarks and logos are trademarks or registered trademarks of Oracle and/or its affiliates.) Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Those skilled in the art having read this disclosure will recognize that changes and modifications may be made to the embodiments without departing from the scope of the present invention.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

The flowchart and block diagrams in the drawings illustrate the architecture, functionality, and operation of possible implementations of systems, methods and program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Note that, although the invention is shown to be used in conjunction with a conventional computer system (i.e., clients 108, 110, 112 and server 104), the invention can easily be used by any handheld device (e.g., cellular telephone, PDA etc.).

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

What is claimed is:

1. A system for visualization of objects along a length of street, comprising:
   a processor; and
   a computer readable storage medium connected to the processor, wherein the computer readable storage medium has stored thereon a program for controlling the processor, and wherein the processor is operative with the program to execute the program for:
   receiving a user selection of a street;

displaying a map view of a map showing streets including the selected street in a map view plane from a vantage point substantially above buildings on the street; and displaying, in the map view of the map showing streets including the selected street, at least a first plurality of thumbnail street view images in views substantially perpendicular to the map view, wherein the thumbnail street view images are from street view vantage points substantially at eye level above the selected street and include images of objects along a first side of the selected street, wherein the street view vantage points are at fixed intervals along the length of the selected street.

2. The system of claim 1, wherein the thumbnail street view images are from respective vantage points along the selected street and displaying the at least first plurality of thumbnail street view images comprises:

displaying the thumbnail street view images laid out along the selected street in the view of the map and proximate to their respective vantage points.

3. The system of claim 1, wherein displaying the at least first plurality of thumbnail street view images comprises:

displaying the first plurality of thumbnail street view images concurrently with a second plurality of thumbnail street view images for respective first and second sides of the selected street.

4. The system of claim 1, wherein the at least first plurality of thumbnail street view images are for a certain length of the selected street and the certain length is determined responsive to a user selection of beginning and ending points for the certain street.

5. The system of claim 1, wherein the at least first plurality of thumbnail street view images are for a certain length of the selected street and the certain length is an entire length of the selected street that is shown in the view of the map.

6. A computer program product for visualization of objects along a length of street, the computer program product including a computer readable storage medium having instructions stored thereon for execution by a computer system, wherein the instructions, when executed by the computer system, cause the computer system to implement a method comprising:

receiving a user selection of a street;

displaying a map view of a map showing streets including the selected street in a map view plane from a vantage point substantially above buildings on the street; and displaying a map view of a map showing streets including the selected street in a map view plane from a vantage point substantially above buildings on the street; and displaying, in the map view of the map showing streets including the selected street, at least a first plurality of thumbnail street view images in views substantially perpendicular to the map view, wherein the thumbnail street view images are from street view vantage points substantially at eye level above the selected street and include images of objects along a first side of the selected street, wherein the street view vantage points are at fixed intervals along the length of the selected street.

7. The computer program product of claim 6, wherein the street view images are from respective vantage points along the selected street and displaying the at least first plurality of thumbnail street view images comprises:

displaying the thumbnail street view images laid out along the selected street in the view of the map and proximate to their respective vantage points.

8. The computer program product of claim 6, wherein displaying the at least first plurality of thumbnail street view images comprises:

displaying the first plurality of thumbnail street view images concurrently with a second plurality of thumbnail street view images for respective first and second sides of the selected street.

9. The computer program product of claim 6, wherein the at least first plurality of thumbnail street view images are for a certain length of the selected street and the certain length is determined responsive to a user selection of beginning and ending points for the certain street.

10. The computer program product of claim 6, wherein the at least first plurality of thumbnail street view images are for a certain length of the selected street and the certain length is an entire length of the selected street that is shown in the view of the map.

* * * * *